(12) United States Patent
Heldmann

(10) Patent No.: US 8,846,808 B2
(45) Date of Patent: Sep. 30, 2014

(54) CURABLE ORGANOPOLYSILOXANE COMPOSITION

(75) Inventor: Dieter Heldmann, Berghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/818,659

(22) PCT Filed: Sep. 15, 2011

(86) PCT No.: PCT/EP2011/065976
§ 371 (c)(1),
(2), (4) Date: Feb. 23, 2013

(87) PCT Pub. No.: WO2012/041708
PCT Pub. Date: Apr. 5, 2012

(65) Prior Publication Data
US 2013/0178581 A1    Jul. 11, 2013

(30) Foreign Application Priority Data
Sep. 29, 2010   (DE) .......................... 10 2010 041 676

(51) Int. Cl.
*C09D 5/08* (2006.01)
*C08L 83/14* (2006.01)
*C08G 77/58* (2006.01)
*C09D 183/14* (2006.01)

(52) U.S. Cl.
CPC *C09D 5/08* (2013.01); *C08G 77/58* (2013.01); *C09D 183/14* (2013.01); *C08L 83/14* (2013.01)
USPC ..................................... 524/588; 252/389.31

(58) Field of Classification Search
None
See application file for complete search history.

(56) References Cited

U.S. PATENT DOCUMENTS

| | | | |
|---|---|---|---|
| 3,845,161 A * | 10/1974 | Beers ............................... | 528/33 |
| 3,846,359 A | 11/1974 | Rostaing | |
| 3,898,176 A | 8/1975 | Schmidhammer et al. | |
| 4,906,719 A * | 3/1990 | Chu et al. ......................... | 528/17 |
| 5,015,413 A * | 5/1991 | Nagaoka ......................... | 252/511 |
| 5,272,240 A * | 12/1993 | Haruvy et al. .................. | 528/10 |
| 5,300,612 A * | 4/1994 | Saruyama ........................ | 528/17 |
| 5,623,030 A * | 4/1997 | Tsumura et al. ............... | 525/478 |
| 6,486,288 B1 | 11/2002 | Ziche et al. | |
| 7,446,158 B2 * | 11/2008 | Okamoto et al. .............. | 526/279 |
| 2009/0169875 A1* | 7/2009 | Endo et al. ..................... | 428/336 |
| 2009/0178589 A1* | 7/2009 | Yoneyama ............... | 106/287.13 |
| 2010/0236450 A1 | 9/2010 | Nabeta et al. | |

FOREIGN PATENT DOCUMENTS

| | | |
|---|---|---|
| CN | 101827905 A | 9/2010 |
| DE | 10045503 A1 | 3/2002 |
| EP | 1104780 A1 | 6/2001 |
| JP | 08-225648 A | 9/1996 |
| JP | 2002-256621 A | 9/2000 |
| JP | 2008-143047 A | 6/2008 |
| JP | 2008-144048 A | 6/2008 |
| JP | 2008-156427 | 7/2008 |
| WO | 2007077130 A1 | 7/2007 |

OTHER PUBLICATIONS

Technical data sheet for ethyl silicate 40, 2001, 1 page.*

* cited by examiner

*Primary Examiner* — Robert S Loewe
(74) *Attorney, Agent, or Firm* — Brooks Kushman P.C.

(57) ABSTRACT

Crosslinkable compositions containing an alkoxy-functional polyorganosiloxane and a titanium chelate complex exhibit good moisture-curing properties and produce coatings resistant to temperature ramp extremes.

17 Claims, No Drawings

CURABLE ORGANOPOLYSILOXANE COMPOSITION

CROSS-REFERENCE TO RELATED APPLICATIONS

This application is the U.S. national phase of PCT Appln. No. PCT/EP2011/065976 filed Sep. 15, 2011 which claims priority to German application 10 2010 041 676.2 filed Sep. 29, 2010, the disclosures of which are incorporated in their entirety by reference herein.

BACKGROUND OF THE INVENTION

1. Field of the Invention

The present invention relates to crosslinkable organopolysiloxane compositions, to processes for preparing them, and to their use, more particularly as heat-stable and/or corrosion protection coatings.

2. Description of the Related Art

U.S. Pat. No. 3,846,359 teaches coating compositions comprising an alkyl silicate and/or an alkyl polysilicate, an alkyl titanate and/or an alkyl polytitanate, a film-forming resin such as a silicone resin, and customary solvents, which cure by air drying.

WO-A 2007/077130 describes coating material compositions comprising a silicone resin, alkyl titanates, aluminum pigments, further pigments and fillers, and also, optionally, alkyl silicates.

JP-A 2008156427 teaches coating material compositions comprising alcohols, silicates, fluoroalkylsilanes, and alkylsilanes, and also various stabilizers, including titanium chelates.

SUMMARY OF THE INVENTION

The invention provides crosslinkable organopolysiloxane compositions preparable using (A) organopolysiloxane comprising units of the general formula

(1), where

R may be identical or different and represents a monovalent, optionally substituted hydrocarbon radical which may be interrupted by heteroatoms, $R^1$ may be identical or different and represents a monovalent, optionally substituted hydrocarbon radical which may be interrupted by heteroatoms, a is 0, 1, 2, or 3, and b is 0, 1, 2, or 3, with the proviso that the sum a+b is ≤3, in at least one unit b is other than 0, and in more than 30%, preferably more than 50%, more preferably in more than 80% of all units of the formula (1) in the organopolysiloxane a is 1, and (B) at least one titanium chelate complex.

Examples of radical R are alkyl radicals such as the methyl, ethyl, n-propyl, isopropyl, 1-n-butyl, 2-n-butyl, isobutyl, tert-butyl, n-pentyl, isopentyl, neo-pentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and 2-propenyl radicals; aryl radicals such as the phenyl, naphthyl, anthryl, and phenanthryl radicals; alkaryl radicals such as the o-, m-, and p-tolyl radicals, xylyl radicals and ethylphenyl radicals; and aralkyl radicals such as the benzyl radical, and the α- and β-phenylethyl radicals.

Examples of halogenated radicals R are haloalkyl radicals such as the 3,3,3-trifluoro-n-propyl radical, the 2,2,2,2',2',2'-hexafluoroisopropyl radical, the heptafluoroisopropyl radical, and haloaryl radicals, such as the o-, m-, and p-chlorophenyl radicals.

Preferably, radical R comprises optionally substituted hydrocarbon radicals having 1 to 18 carbon atoms, more preferably hydrocarbon radicals having 1 to 6 carbon atoms, yet more preferably the methyl and the phenyl radical, and most preferably the methyl radical.

Examples of radical $R^1$ are the radicals specified for the radical R. With preference radicals $R^1$ comprise hydrogen or hydrocarbon radicals having 1 to 18 carbon atoms, more preferably hydrogen and hydrocarbon radicals having 1 to 8 carbon atoms, and most preferably methyl or ethyl radicals.

The average value for a is preferably 0.8 to 1.5.

The average value for b is preferably 0.5 to 1.5.

Component (A) used in accordance with the invention preferably comprises organopolysiloxanes composed of units of the formula (1) in which in more than 30%, more preferably in more than 50%, and most preferably in more than 80% of the units in the resin, a is 1.

The organopolysiloxane (A) used in accordance with the invention preferably consists of M ($\equiv SiO_{1/2}$), D ($\equiv SiO_{2/2}$), T ($-SiO_{3/2}$) and/or Q ($SiO_{4/2}$) units, more preferably essentially of M, D and T units, and most preferably of M, D and T units.

With particular preference component (A) comprises organopolysiloxanes which comprise essentially units having only one SiC bond, corresponding to a=1. The polyorganosiloxane is preferably composed to an extent of more than 30%, more preferably more than 50%, most preferably more than 80% of units of the formula (1) for which a is 1. Preferably, moreover, the organopolysiloxanes (A) contain from 0.1 to 35 wt % of free hydroxyl and/or alkoxy groups. Furthermore, the organopolysiloxanes may comprise M and/or Q units, although this is not preferred.

The organopolysiloxanes (A) used in accordance with the invention are preferably solid or liquid, more preferably liquid, at 25° C. and under the pressure of the surrounding atmosphere, in other words 900 to 1100 hPa.

The organopolysiloxanes (A) used in accordance with the invention preferably have a viscosity at 25° C. of 5 to 5000 mm²/s, more preferably 5 to 500 mm²/s, and most particularly 5 to 100 mm²/s.

The organopolysiloxanes (A) used in accordance with the invention preferably have a weight-average molecular weight $M_w$ of 700 to 200,000 g/mol, and more preferably of 700 to 10,000 g/mol, in each case measured in toluene against polystyrene as a standard.

For the organopolysiloxanes used in accordance with the invention, the mean number-average molecular weight $M_n$ is preferably greater than 250, more preferably 250 to 5000, yet more preferably 500 to 3000, and most preferably 500 to 1500, in each case measured in toluene against polystyrene as a standard.

Examples of the component (A) used in accordance with the invention are those siloxane resins having the units

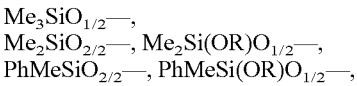

$Ph_2SiO_{2/2}$—, $Ph_2Si(OR)O_{1/2}$—,
$Pr_2SiO_{2/2}$—, $Pr_2Si(OR)O_{1/2}$—,
$PhSiO_{3/2}$—, $PhSi(OR)O_{2/2}$—, $PhSi(OR)_2O_{1/2}$—,
$MeSiO_{3/2}$—, $MeSi(OR)O_{2/2}$—, $MeSi(OR)_2O_{1/2}$—,
$EtSiO_{3/2}$—, $EtSi(OR)O_{2/2}$—, $EtSi(OR)_2O_{1/2}$—,
$PrSiO_{3/2}$—, $PrSi(OR)O_{2/2}$—, $PrSi(OR)_2O_{1/2}$—, more preferably organopolysiloxanes having the units
$Me_2SiO_{2/2}$—, $Me_2Si(OR)O_{1/2}$—,
$PhSiO_{3/2}$—, $PhSi(OR)O_{2/2}$—, $PhSi(OR)_2O_{1/2}$—,
$MeSiO_{3/2}$—, $MeSi(OR)O_{2/2}$—, $MeSi(OR)_2O_{1/2}$—, where Me is the methyl radical, Et is the ethyl radical, Ph is the phenyl radical, Pr is propyl radical, and R is a methyl, ethyl, propyl, or butyl radical.

Components (A) are commercially available products and/or may be prepared by methods commonplace in silicon chemistry.

Examples of titanium chelate complexes (B) used in accordance with the invention are titanium acetylacetonates such as $(i-C_3H_7O)_2Ti(C_5H_7O_2)_2$ CAS No. [17927-72-9], $(i-C_3H_7O)(C_4H_5O)Ti(C_5H_7O_2)_2$ CAS No. [97281-09-9], $(i-C_3H_7O)(C_2H_5O)Ti(C_5H_7O_2)_2$ CAS No. [68568-02-7] diisopropoxybis(ethylacetoacetate)titanate $(i-C_3H_7O)_2Ti(C_6H_9O_3)_2$ CAS No. [27858-32-8], di-n-butoxybisethylacetoacetate titanate $(n-C_4H_9O)_2Ti(C_6H_9O_3)_2$ CAS No. [20753-28-0], diisobutoxybisethylacetoacetate titanate $(i-C_4H_9O)_2Ti(C_6H_9O_3)_2$ CAS No. [83877-91-2], triethanolamine titanates such as $(n-C_3H_7O)_2Ti(C_6H_{14}NO_3)_2$ CAS No. [36673-16-2], lactic acid chelate titanate CAS No. [65104-06-5], and isostearoyl titanate CAS No. [61417-49-0].

The titanium chelate complexes (B) used in accordance with the invention may be used directly as they are or may be formed in situ from the titanates and the chelate ligands during the preparation of the composition of the invention, preference being given to the use of the pure titanium chelate complexes (B).

Component (B) used in accordance with the invention comprises preferably bis(ethylacetoacetato-O1',O3)bis(propan-2-olato)titanium, CAS No. [27858-32-8], bis(pentane-2,4-dionato-O,O')bis(propan-2-olato)titanium, CAS No. [17927-72-9], ethoxybis(pentane-2,4-dionato-O,O')(propan-2-olato)titanium, CAS No. [68586-02-7], bis(ethylacetoacetato-O1',O3)bis(isobutan-1-olato)titanium, CAS No. [83877-91-2], and bis(ethylacetoacetato-O1',O3)bis(n-butan-1-olato)titanium, CAS No. [20753-28-0], more preferably bis(ethylacetoacetato-O1',O3)bis(propan-2-olato)titanium, CAS No. [27858-32-8], bis(ethylacetoacetato-O1',O3)bis(isobutan-1-olato)titanium, CAS No. [83877-91-2], and bis(ethylacetoacetato-O1',O3)bis(n-butan-1-olato)titanium, CAS No. [20753-28-0].

Component (B) may be used as the pure substance or in a mixture with solvent. The solvents with which component (B) may be mixed are preferably alcohols such as methanol, ethanol, 1-propanol, 2-propanol, n-butanol, 2-butanol, and isobutanol, particular preference being given to the alcohol corresponding to the alkoxy groups of the titanate used.

The titanium chelate complexes (B) used in accordance with the invention are commercially available and/or can be prepared by known chemical methods. Commercially available examples are Tyzor® AA, AA-65, AA-75, AA-105, GBA, GBO, DC, TE, PITA from DuPont, USA;

VERTEC™ XL 165, KE2, KE4, KE6 from Johnson Matthey Catalysts, England, and

TYTAN™ S2, S4, S6 from Borica Co., Taiwan.

The compositions of the invention comprise component (B) in amounts of preferably 0.001 to 50 parts by weight, more preferably 0.1 to 10 parts by weight, and most preferably 1 to 5 parts by weight, based in each case on 100 parts by weight of organopolysiloxane (A).

In addition to the above-described components (A) and (B), the compositions of the invention may comprise all further substances which have also been employed to date in crosslinkable organopolysiloxane compositions, such as, for example, fillers (C), pigments (D), binders (E), and additives (F).

The fillers (C) may be all fillers which are useful in crosslinkable silicone materials. A filler is a particulate substance which is virtually insoluble in the application medium and which is used in order to enlarge the volume or to improve technical properties and/or influence optical properties.

Suitable fillers (C) contemplated may, generally, be all materials that are used in the coatings sector, such as, for example, calcium carbonates, e.g., chalk, calcite, and precipitated calcium carbonate; dolomites (calcium magnesium carbonates); silicon dioxide (finely ground quartz), fumed silicas; silicates, e.g., talc, kaolin, mica, and sulfates, e.g., heavy spar and so-called blanc fixe.

Examples of fillers (C) are non-reinforcing fillers, these being fillers having a BET surface area of up to 50 $m^2/g$, such as quartz, diatomaceous earth, calcium silicate, zirconium silicate, zeolites, metal oxide powders such as aluminum oxides, titanium oxides, iron oxides or zinc oxides and/or the mixed oxides of these, barium sulfate, calcium carbonate, gypsum, silicon nitride, silicon carbide, boron nitride, glass powders, and plastics powders; reinforcing fillers, these being fillers having a BET surface area of at least 50 $m^2/g$, such as pyrogenically prepared silica, precipitated silica, carbon blacks such as furnace black and acetylene black, and mixed silicon aluminum oxides of high BET surface area; fibrous fillers, such as asbestos, and also plastics fibers.

The stated fillers may have been hydrophobized, as for example by treatment with organosilanes and/or organo-siloxanes, or by etherification of hydroxyl groups to alkoxy groups.

The average particle size ($d_{50}$) of the fillers (C) used is below 100 µm, preferably less than 25 µm, more preferably between 0.01 to 10 µm.

The optional fillers (C) are preferably calcium carbonate, finely ground quartz, fumed silicas, silicates such as talc, kaolin, mica, and/or sulfates such as, for example, heavy spar and blanc fixe.

If the compositions of the invention comprise component (C), the amounts are preferably 0.1 to 200 parts by weight, more preferably 1 to 100 parts by weight, and most preferably 10 to 100 parts by weight, based in each case on 100 parts by weight of organopolysiloxane (A).

The compositions of the invention preferably comprise fillers (C).

The pigments (D) may be all pigments which are useful in crosslinkable silicone materials. Examples of optionally employed pigments (D) are natural pigments, such as chalk, ocher, umber, and green earth, mineral pigments, such as titanium dioxide (anatase and rutile types), chromium oxide green pigments, chromium yellow, red lead oxide, zinc white, zinc oxide pigments, zinc sulfide pigments, lithopones, zinc yellow, zinc green, pigment blacks (gas black, furnace black or lamp black types), iron oxide pigments (yellow iron oxide, red iron oxide, black iron oxide, brown iron oxide), cadmium pigments (cadmium yellow, orange, and red), cobalt blue, ultramarine pigments, iron blue pigments, and bismuth vanadate pigments, and also organic pigments, such as sepia, Cassel brown, indigo, azo pigments, anthraquinoid, indigoid, dioxazine, quinacridone, phthalocyanine, isoindolinone, and alkali blue pigments. Many of the inorganic pigments also function as fillers, and vice versa.

The aluminum pigments (D) which may optionally be present in the organopolysiloxane composition of the invention are typically platelet-shaped with form factors (thickness to diameter) of 1:50 to 1:500. Both "leafing" and "nonleafing" types may be used.

The addition of anticorrosion pigments (D) such as zinc dust or trizinc bis(orthophosphate).2-4H$_2$O, zinc oxide, or mixtures and modifications is possible and these are known to the skilled person.

Optional pigments (D) are preferably heat-resistant pigments, more preferably heat-resistant inorganic pigments such as rutiles, spinels, and hematites. Examples of heat-resistant inorganic pigments are known to those skilled in the art, and include, among others, black pigments such as synthetic mixed iron manganese oxides (e.g., Bayferrox 303T, Lanxess), manganese iron spinels (e.g., PK 3060, Ferro Corp.) or copper chromite spinels (e.g., PK 3095, Ferro Corp.). Besides these inorganic pigments it is also possible for carbon black grades to serve as a black pigment.

The optional pigments (D) are more preferably heat-stable pigments such as, for example
- (pigment-grade) carbon blacks,
- inorganic mixed oxide phase pigments of the spinel, rutile, hematite, or phosphate types,
- aluminum pigments,
- titanium dioxide, and
- zinc dust, more particularly synthetic inorganic black pigments such as mixed iron manganese oxides (Fe,Mn)$_2$O$_3$ CAS No. [12062-81-6, 75864-23-2], manganese iron spinels CAS No. [68186-94-7], copper chromium spinels CAS No. [68186-91-4], aluminum pigments, and pigment-grade carbon blacks.

The black pigments are available from sources including commercial sources under the trade names PK-3060 and PK-3095 from Ferro Corp., USA or Bayferrox 303T from Lanxess, Germany or Ferritan 2400 from Rockwood Pigments, UK.

Aluminum pigments are available commercially under the trade name STAPA® from Eckart, Germany, e.g., STAPA® pastes 2, 4 or 6.

Pigment-grade carbon blacks are available commercially, from Evonik, Germany, for example.

If the compositions of the invention comprise component (D), the amounts are preferably 0.1 to 100 parts by weight, more preferably 1 to 100 parts by weight, and most preferably 5 to 80 parts by weight, based in each case on 100 parts by weight of organopolysiloxane resin (A).

The compositions of the invention preferably comprise pigments (D).

The binders (E) may be all binders which are useful in crosslinkable silicone materials. Examples of optionally employed binders (E) are alkyl orthosilicates and/or their hydrolyzates, the alkyl substituents preferably containing 1 to 8 carbon atoms, and more preferably the ethyl radical. Hydrolyzed alkyl orthosilicates are preferably mixtures of monomeric and various oligomeric and/or cyclic condensation products of alkyl orthosilicates, and may be considered to be a polymer. This condensation product is characterized by a silicon dioxide content of preferably 28 to 50 wt %, more preferably of 40 to 45 wt %. Such alkyl silicates and also hydrolyzed alkyl silicates are known to those skilled in the art and are available commercially, for example under the trade name "Silikat TES 40 WN" from Wacker Chemie AG, D-Munich, for example.

Other examples of component (E) are organic binders, especially film-forming binders such as acrylic resins, polyester resins, alkyd resins, polyols, and hydrocarbon resins.

The optionally employed binders (E) are preferably alkyl orthosilicates and/or hydrolyzates thereof.

If the compositions of the invention comprise component (E), the amounts are preferably 0.1 to 50 parts by weight, more preferably 0.1 to 10 parts by weight, and most preferably 0.1 to 5 parts by weight, based in each case on 100 parts by weight of organopolysiloxane resin (A).

The compositions of the invention preferably comprise no component (E).

The compositions of the invention may comprise additives (F), such as defoamers, deaerating agents, lubricants, flow control agents, organic solvents, dispersing auxiliaries and wetting auxiliaries, substrate wetting additives, thixotropic agents, water scavengers, and adhesion promoters.

The nature and amount of the additives (F) optionally employed are dependent primarily on the particular application of the organopolysiloxane composition of the invention.

The compositions of the invention preferably comprise no additives (F).

The components employed in accordance with the invention may in each case be one kind of such a component or else a mixture of at least two kinds of a respective component.

The organopolysiloxane compositions of the invention are preferably of the kind preparable using
- (A) organopolysiloxanes comprising units of the formula (1),
- (B) titanium chelate complexes,
- optionally
- (C) fillers,
- optionally
- (D) pigments,
- optionally
- (E) binders,
- and optionally
- (F) additives.

The compositions of the invention preferably comprise, apart from components (A) to (F), no other components.

The compositions of the invention may be solutions or dispersions.

The compositions of the invention are preferably liquids of low viscosity at 25° C. under the pressure of the surrounding atmosphere.

The compositions of the invention preferably have a viscosity of 5 to 3000 mm$^2$/s, more preferably of 5 to 500 mm$^2$/s, in each case at 25° C.

The compositions of the invention preferably have a volatile organic content (VOC) of less than 500 grams per liter, more preferably a VOC content of less than 250 grams per liter, in each case determined by EPA method 24 (EPA: US Environmental Protection Agency). The alcohols which may be released during the crosslinking of the organopolysiloxane composition of the invention are included in the VOC figure.

The solids content of the organopolysiloxane composition of the invention is preferably higher than 60 wt %, more preferably higher than 80 wt %, and most preferably 80 to 99 wt %, based in each case on the weight of the overall composition.

For preparing the compositions of the invention it is possible to mix all of the constituents with one another in any desired order. Preferably, then, the organopolysiloxane component (A) is first mixed with the optional components, such as fillers (C), pigments (D), binders (E), and additives (F). This mixing may take place at room temperature under the pressure of the surrounding atmosphere, i.e., approximately 900 to 1100 hPa. If desired, however, this mixing may also take place at higher temperatures, as for example at temperatures in the range from 35 to 135° C. It is possible, furthermore, to carry out mixing occasionally or continually under reduced pressure, such as at an absolute pressure of 30 to 500 hPa, for example, in order to remove volatile compounds or air. Component (B) is preferably not added until the end of preparation. This may also take place not until immediately before the processing of the organopoly-siloxane composition of the invention.

The organopolysiloxane compositions of the invention are prepared more particularly by mixing the liquid components and dispersing the components that are insoluble therein, using methods known to the skilled person such as dissolvers, roll mills (triple-roll mills or stirred ball mills) until the desired particle size is reached.

The present invention further provides a process for preparing the organopolysiloxane compositions of the invention by mixing the individual constituents.

The composition of the invention is preferably prepared very largely in the absence of moisture.

The usual water content of the air is sufficient for the crosslinking of the compositions of the invention. The materials of the invention are preferably crosslinked preferably at room temperature. Their crosslinking may also, if desired, be accomplished at temperatures higher or lower than room temperature, as for example at $-5°$ to $15°$ C. or at $30°$ C. to $200°$ C., and/or by means of water concentrations that exceed the normal water content of the air. Another possibility is the direct admixing of water or of compounds which are able to give off water.

The crosslinking is preferably carried out under the pressure of the surrounding atmosphere, i.e., approximately 900 to 1100 hPa.

The present invention additionally provides shaped bodies, more particularly coatings, produced by crosslinking the compositions of the invention.

The compositions of the invention can be employed for all end uses for which it is possible to employ materials which are storable in the absence of water and which crosslink at room temperature on ingress of water.

The materials of the invention are therefore outstandingly suitable for the production of coatings.

Crosslinkable compositions of the invention are used preferably for producing coatings. The coatings are produced by applying the crosslinkable compositions of the invention to the surfaces that are to be coated, and then curing the compositions.

Application of the compositions of the invention to the surfaces that are to be coated may take place in any desired way which is suitable and widely known for the production of coatings from liquid materials—for example, by means of dipping, spreading, pouring, spraying, such as airless spray application or conventional spray application, for example.

The surfaces for coating that can be treated in the context of the invention may be surfaces of any desired substances which are solid at room temperature and 1012 hPa. Examples of such surfaces are those of wood, ceramic articles, glass, including glass fibers, metals, and composite materials.

The surfaces for coating are preferably those of metals, more preferably iron, steel, and aluminum (alloys).

Curing of the organopolysiloxane composition of the invention with atmospheric moisture occurs particularly quickly when the composition is applied as a thin film with a layer thickness of preferably less than 500 μm, more preferably 5 to 200 μm, and most preferably 5 to 100 μm, to surfaces such as those of metal, for example.

Advantageously the organopolysiloxane compositions of the invention crosslink rapidly at ambient temperature to form a hard, high molecular mass organopolysiloxane film as soon as they are applied in a thin layer to a surface and come into contact with moisture, and the articles coated with the silicone resin composition of the invention can then be worked on further very quickly.

The cured organopolysiloxane compositions have a König pendulum hardness (DIN EN ISO 1522) of at least 30, preferably 40, more preferably more than 50 pendulum swings.

The crosslinking of the organopolysiloxane composition of the invention generally does not necessitate any heating. The cured organopolysiloxane composition protects metal articles from corrosion and chemicals even on pure room-temperature crosslinking. The good chemical resistance achieved in accordance with the invention is a clear pointer to the high degree of crosslinking of the resin film cured at ambient temperature. It is, however, also possible for crosslinking to proceed only partially at room temperature. In that case, additional heating of the coating, at 200° C., for example, may lead to complete crosslinking and may thus further improve properties such as corrosion resistance or mechanical properties.

The coating of the invention is especially suitable for the corrosion protection of metals, such as all kinds of steel constructions, for example. The coated surfaces may be exposed directly to the environment or else may be situated beneath an insulating layer. Advantageously the cured organopolysiloxane film of the present invention is also resistant in the face of fluctuating temperature loads, such as quenching in cold water or sudden contact with heat, for instance.

The organopolysiloxane compositions of the invention are optimally suitable for the coating of construction steel in the chemical process industry, offshore drilling platforms, the petrochemical industry, or power stations. This includes all kinds of refineries, process units, pipelines, chimneys, containers, flare units, exhaust gas units, ovens, external areas of reactors, power stations, smokestacks, and other structures exposed to high or low temperatures.

The materials of the invention have the advantage that they are easy to prepare, are distinguished by a very long shelf life, and are rapidly crosslinkable.

The organopolysiloxane compositions of the invention have the advantage, moreover, that spray application can be carried out at application temperatures in the $-5$ to $+40°$ C. range.

Furthermore, the organopolysiloxane compositions of the invention have the advantage that they are of low viscosity and have a low volatile organic compound (VOC) fraction.

The coatings of the invention have the advantage that they are heat-resistant and crack-resistant, even at high temperatures and with cyclical temperature changes. Preference here is given to coatings which withstand a so-called shock test. In this test the crosslinked film on a metal surface is heated to a temperature of 400, 500, or 600° C. and then immersed into a water bath which is at room temperature. The crosslinked organopolysiloxane film of the invention preferably withstands even rapid heating intact—when placed in an oven which is at 500° C., for example.

The examples described below unless otherwise indicated, are carried out under the pressure of the surrounding atmosphere, in other words approximately at 1000 hPa, and at room temperature, in other words at approximately 23° C., or at a temperature which comes about when the reactants are combined at room temperature without additional heating or cooling, and also at a relative atmospheric humidity of approximately 50%. Furthermore, all figures for parts and percentages, unless otherwise indicated, are by weight.

In the examples, freedom from tack is determined as follows: Firm pressing with the thumb is used to examine whether there is still any surface damage or surface alteration produced.

In the text below, Me denotes the methyl radical and Ph denotes the phenyl radical.

EXAMPLE 1.X

In each case 100 g of a liquid organopolysiloxane having a viscosity of 25 mPas at 25° C. and the average structural formula $MeSi(OMe)_{0.8}O_{1.1}$, consisting of 21 mol % [MeSi$(OMe)_2O_{1/2}$], 46 mol % [MeSi(OMe)$O_{2/2}$], and 33 mol % [MeSiO$_{3/2}$] units and with a mean number-average molecular weight $M_n$ of 800 g/mol, were mixed with in each case 5 g of the titanium components stated in table 1, and the mixture was applied as a film, using a bar coater, to a steel surface. Under standard conditions (23° C./50% relative humidity), a determination was made of the times until the film acquired freedom from tack. The results are found in table 1.

TABLE 1

| Example | Titanium component | Trade name | Tack-free after [min] |
|---|---|---|---|
| 1.1 | Bis(ethylacetoacetato-O1,O3)bis(propan-2-olato)titanium | Tyzor ® PITA | 10 |
| 1.2 | Bis(ethylacetoacetato-O1,O3)bis(propan-2-olato)titanium | Tytan ™ S2 | 10 |
| C1.1[1] | Polybutyl titanate | Tytan ™ PBT | 20 |
| C1.2 | Polybutyl titanate | Vertec PBT | 22 |
| C1.3 | Tetra-n-butyl titanate | Tyzor ® BTM | 20 |
| C1.4 | Tetraisopropyl titanate | Vertec XL 110 | 22 |
| C1.5 | Tetraethyl titanate | Tyzor ® ET | Precipitation |
| C1.6 | Tetraethyl titanate | Tytan ™ TET | Precipitation |
| C1.7 | Titanium phosphate | Tyzor ® IAM | 110 |

[1]C indicates a comparative (non-inventive) example.

The Tytan™ products are available from Borica Co., Ltd., Taiwan;

The Tyzor® products are available from E.I. du Pont de Nemours USA;

The Vertec™ products are available from Johnson-Matthey Catalysts, England.

COMPARATIVE EXAMPLES C1.X

The procedure described in example 1 is repeated with different tetraalkyl titanates and titanium phosphate in accordance with table 1. The results are found in table 1.

EXAMPLE 2

100 g of a liquid organopolysiloxane with a viscosity of 400 mPas at 25° C. and with the average structural formula $PhSi(OMe)_{1.04}O_{0.96}$ (consisting of 27 mol % [PhSi(OMe)$_2$O$_{1/2}$)], 51 mol % [PhSi(OMe)O$_{2/2}$], 22 mol % [PhSiO$_{3/2}$] units) and also with a mean number-average molecular weight $M_n$ of 700 g/mol were admixed with 7 g of the titanium chelate TYZOR® PITA and applied to a steel surface.

Under standard conditions (23° C./50% relative humidity), the mixture had cured after 4.5 hours to form a hard, tack-free film.

COMPARATIVE EXAMPLE C2

The procedure described in example 2 is repeated with the modification that 7 g of n-butyl titanate were used instead of the titanium chelate.

After 24 hours the film showed no curing and was still liquid.

EXAMPLE 3

50.8 g of the organopolysiloxane described in example 1, 33.8 g of aluminum pigment (available commercially under the designation "STAPA 2 leafing" from Eckart Effect Pigments, Germany), 3.4 g of a 15% dispersion of a highly disperse silica in xylene (available commercially under the designation HDK® H13L from Wacker Chemie AG, D-Germany), and 6.7 g of aromatic hydrocarbon mixture with a boiling range of 155-181° C. (available commercially under the designation Solvesso™ 100 from Silbermann, Germany) are mixed with one another and dispersed in a laboratory dissolver at 800 rpm for 15 minutes.

Then 1.7 g of vinyltrimethoxysilane (available commercially under the designation GENIOSIL® XL 10 from Wacker Chemie AG, D-Germany) and 3.6 g of titanium chelate Tyzor® PITA are incorporated with stirring at a speed of 800 rpm.

The resulting organopolysiloxane composition crosslinks under standard conditions (23° C./50% relative humidity) as a thin film (100 μm wet film thickness) applied to steel panel in less than 15 minutes to give a hard, silver-colored film. The pendulum hardness, determined 24 hours after application, was 58 swings.

EXAMPLE 4

49.7 g of the organopolysiloxane described in example 1, 10.7 g of a talc/quartz/chlorite mixture (available commercially under the designation Plastorit 0000 from Luzenac, France), 10.7 g of anticorrosion pigment (available commercially under the designation Heucophos® ZCPplus from Heubach, Germany), 14.2 g of black pigment (available commercially under the designation Ferro PK 3095 from Ferro Corporation, USA), and 1.4 g of a 15% dispersion of a highly disperse silica in xylene (available commercially under the designation HDK® H13L from Wacker Chemie AG, D-Germany) are mixed with one another and dispersed in a laboratory dissolver at 5000 rpm for 15 minutes.

Then 7.1 g of aluminum pigment (available commercially under the designation "Blitz Alupowder 7825" from Benda-Lutz, Austria) are incorporated with stirring at a speed of 800 rpm, and also, afterward, 2.0 g of vinyltrimethoxysilane (available commercially under the designation GENIOSIL® XL 10 from Wacker Chemie AG, D-Germany) and 4.3 g of titanium chelate Tyzor® PITA are incorporated with stirring at a speed of 800 rpm.

The resulting organopolysiloxane composition crosslinks under standard conditions (23° C./50% relative humidity) as a thin film (100 μm wet film thickness) applied to steel panel in less than 15 minutes to give a hard, gray metallic-colored film. The pendulum hardness, determined 24 hours after application, was 73 swings.

EXAMPLE 5

49.8 g of the organopolysiloxane described in example 1, 10.7 g of talc (available commercially under the designation Talcum EL10 from Luzenac, France), 3.0 g of anticorrosion pigment (available commercially under the designation Heucophos® ZCPplus from Heubach, Germany), 10.0 g of black pigment (available commercially under the designation Ferro PK 3095 from Ferro Corporation, USA), and 1.0 g of a 15% dispersion of a highly disperse silica in xylene (available commercially under the designation HDK® H13L from Wacker Chemie AG, D-Germany) are mixed with one another and dispersed in a laboratory dissolver at 5000 rpm for 15 minutes.

Then 5.0 g of the organopolysiloxane described in example 1, 1.4 g of vinyltrimethoxysilane (available commercially under the designation GENIOSIL® XL 10 from Wacker Chemie AG, D-Germany) and 3.0 g of titanium chelate Tyzor® PITA are incorporated with stirring at a speed of 800 rpm.

The resulting organopolysiloxane composition crosslinks under standard conditions (23° C./50% relative humidity) as a thin film (100 μm wet film thickness) applied to steel panel in less than 15 minutes to give a hard, black film. The pendulum hardness, determined 24 hours after application, was 75 swings.

COMPARATIVE EXAMPLE C3

23.0 g of the organopolysiloxane described in example 1, 1.7 g of n-buytl titanate, 37.0 g of aluminum pigment (available commercially under the designation STAPA 2 from Eckart, Germany), 8.3 g of ethylcellulose (available commercially under the designation Aqualon EC N 22 from Hercules, USA), and 30.0 g of xylene are dispersed in a laboratory dissolver at around 800 rpm for 10 minutes.

The resulting organopolysiloxane composition, under standard conditions (23° C./50% relative humidity), as a thin film (100 μm wet film thickness) applied to steel panel, requires more than 40 minutes to cure to a hard, silver-colored film.

EXAMPLE 6

80 g of the organopolysiloxane described in example 1, 60 g of talc (available commercially under the designation Talcum EL10 from Luzenac, France), 20 g of black pigment (available commercially under the designation Ferro PK 3095 from Ferro Corporation, USA), 4 g of Bentone 38 (15% dispersion in xylene) (available commercially under the designation Bentone 38 from Elementis Specialities, 1831 Diegem, Belgium), and 30 g of xylene are mixed with one another and dispersed in a laboratory dissolver at 5000 rpm for 15 minutes.

Then 5.6 g of titanium chelate Tyzor® PITA are incorporated with stirring.

Parts of the resulting organopolysiloxane composition are then stored at 70° C. for the time periods indicated in table 2, after which they are each applied as a thin film (100 μm wet film thickness) to steel panel and left to crosslink under standard conditions (23° C./50% relative humidity), and a determination is made of the time until freedom from tack is attained. The results are found in table 2.

TABLE 2

| Storage at 70° C. in [d] | Tack-free after [min] | |
|---|---|---|
| | Comparative example C4 | Example 6 |
| 0 | 40 | 10 |
| 7 | 33 | 8 |
| 14 | 33 | 8 |
| 28 | sample gels in bottle | 7 |

COMPARATIVE EXAMPLE C4

The procedure described in example 6 is repeated, with the modification that 5.6 g of poly-n-butyl titanate, CAS 9022-96-2, were used instead of 5.6 g of the titanium chelate. The results are found in table 2.

EXAMPLE 7

100 g of a liquid organopolysiloxane having a viscosity of 5 mPas at 25° C., consisting of 9 mol % $Me_2SiO_{1/2}(OMe)$, 11 mol % $Me_2SiO_{2/2}$, 27 mol % $MeSiO_{1/2}(OMe)_2$, 38 mol % $MeSiO_{2/2}(OMe)$, and 15 mol % $MeSiO_{3/2}$ units and having a mean number-average molecular weight $M_n$ of 500 g/mol, was mixed with 5 g of titanium chelate Tyzor® PITA and applied as a thin film to a steel surface. Under standard conditions (23° C./50% relative humidity), a determination was made of the times taken for the film to acquire freedom from tack. The results are found in table 3.

TABLE 3

| | Tack-free after [min] |
|---|---|
| Example 7 | 19 |
| Comparative example C5 | 50 |

COMPARATIVE EXAMPLE C5

The procedure described in example 7 is repeated, with the modification that 7 g of poly-N-butyl titanate, CAS 9022-96-2, were used instead of 5 g of the titanium chelate. The results are found in table 3.

EXAMPLE 8

100 g of a liquid organopolysiloxane having a viscosity of 450 mPas at 25° C. and an average structural formula $Ph_{0.6}Me_{0.46}Si(OMe)_{0.8}O_{1.13}$ (consisting of 5 mol % $[Me_2SiO_{2/2}]$, 5 mol % $[MeSi(OMe)_2O_{1/2}]$, 15 mol % $[MeSi(OMe)O_{2/2}]$, 16 mol % $[MeSiO_{3/2}]$, 14 mol % $[PhSi(OMe)_2O_{1/2}]$, 27 mol % $[PhSi(OMe)O_{2/2}]$, 18 mol % $[PhSiO_{3/2}]$ units) and having a mean number-average molecular weight $M_n$ of 800 g/mol, was admixed in each case with 7 g of the titanium chelate Tyzor® PITA and applied to a steel surface.

Under standard conditions (23° C./50% relative humidity), the mixture had cured after 2 hours to give a hard, tack-free film.

COMPARATIVE EXAMPLE C6

The procedure described in example 8 is repeated, with the modification that 7 g of n-butyl titanate were used instead of the titanium chelate.

After 12 hours the film showed no curing and was still tacky.

The invention claimed is:

1. A crosslinkable organopolysiloxane composition, prepared by admixing:
   (A) an organopolysiloxane component, the organopolysiloxane consisting of units of the formula $$R_a Si(OR^1)_b O_{(4-a-b)/2} \qquad (1),$$

where
   R are identical or different monovalent, optionally substituted hydrocarbon radicals optionally interrupted by heteroatoms,
   $R^1$ are identical or different monovalent, optionally substituted hydrocarbon radicals optionally interrupted by heteroatoms,
   a is 0, 1, 2, or 3, and
   b is 0, 1, 2, or 3,
   with the proviso that the sum a+b is ≤3 in at least one unit b is other than 0, and in more than 50% of all units of the formula (1) in the organopolysiloxane a is 1, and
   (B) at least one titanium chelate complex, wherein units of the formula (I) include D units where the sum of a+b is 2.

2. The crosslinkable organopolysiloxane composition of claim 1, wherein component (B) comprises at least one titanium chelate complex selected from the group consisting of bis(ethylacetoacetato-O1',O3)bis(propan-2-olato)titanium, bis(ethylacetoacetato-O1',O3)bis(isobutan-1-olato)titanium, and bis(ethylacetoacetato-O1',O3)bis(n-butan-1-olato)titanium.

3. The crosslinkable organopolysiloxane composition of claim 2, comprising component (B) in an amount of from 0.001 to 50 parts by weight, based on 100 parts by weight of organopolysiloxane (A).

4. The crosslinkable organopolysiloxane composition of claim 1, comprising component (B) in an amount of from 0.001 to 50 parts by weight, based on 100 parts by weight of organopolysiloxane (A).

5. The crosslinkable organopolysiloxane composition of claim 1, further comprising one or more of
   (C) fillers,
   (D) pigments,
   (E) binders, and
   (F) additives selected from the group consisting of defoamers, deaerating agents, lubricants, flow control agents, organic solvents, dispersing agents, wetting agents, substrate wetting agents, thixotropic agents, water scavengers, and adhesion promoters.

6. The crosslinkable organopolysiloxane composition of claim 5, wherein apart from components (A) to (F), the crosslinkable organopolysiloxane compositions contain no other components.

7. A process for preparing a crosslinkable organopolysiloxane composition of claim 1, comprising mixing the individual constituents together.

8. A shaped body, prepared by crosslinking a composition prepared by the process of claim 7.

9. The shaped body of claim 8, which is a coating.

10. A shaped body prepared by crosslinking the crosslinkable organopolysiloxane composition of claim 1.

11. The shaped body of claim 10, which is a coating.

12. The composition of claim 1, wherein in more than 80% of units of the formula (I), a is 1.

13. The crosslinkable organopolysiloxane composition of claim 1, wherein the organopolysiloxane (A) has a viscosity of 5 to 5000 mm²/s at 25° C.

14. The crosslinkable organopolysiloxane composition of claim 13, wherein component (B) comprises at least one titanium chelate complex selected from the group consisting of bis(ethylacetoacetato-O1',O3)bis(propan-2-olato)titanium, bis(ethylacetoacetato-O1',O3)bis(isobutan-1-olato)titanium, and bis(ethylacetoacetato-O1',O3)bis(n-butan-1-olato)titanium.

15. The crosslinkable organopolysiloxane composition of claim 13, comprising component (B) in an amount of from 0.001 to 50 parts by weight, based on 100 parts by weight of organopolysiloxane (A).

16. A crosslinkable organopolysiloxane composition, prepared by admixing:
   (A) an organopolysiloxane component, the organopolysiloxane consisting of units of the formula $$R_a Si(OR^1)_b O_{(4-a-b)/2} \qquad (1),$$

where
   R are identical or different monovalent, optionally substituted hydrocarbon radicals optionally interrupted by heteroatoms,
   $R^1$ are identical or different monovalent, optionally substituted hydrocarbon radicals optionally interrupted by heteroatoms,
   a is 0, 1, 2, or 3, and
   b is 0, 1, 2, or 3,
   with the proviso that the sum a+b is ≤3, in at least one unit b is other than 0, and in more than 50% of all units of the formula (1) in the organopolysiloxane a is 1, and
   (B) at least one titanium chelate complex, and
   E) a binder selected,
   wherein at least one binder is present and is selected from the group consisting of acrylic resins, polyester resins, alkyd resins, polyols, and hydrocarbon resins.

17. The composition of claim 16, wherein the binder is present and comprises an alkyl orthosilicate or hydrolysate thereof.

* * * * *